(12) United States Patent
Vajravel et al.

(10) Patent No.: US 11,844,140 B2
(45) Date of Patent: Dec. 12, 2023

(54) HANDING OFF AND SHARING TRAFFIC ACROSS DIFFERENT TRANSPORTS BETWEEN A COMPUTING DEVICE AND A DOCK

(71) Applicant: Dell Products L.P., Round Rock, TX (US)

(72) Inventors: Gokul Thiruchengode Vajravel, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 255 days.

(21) Appl. No.: 17/391,294

(22) Filed: Aug. 2, 2021

(65) Prior Publication Data

US 2023/0037153 A1    Feb. 2, 2023

(51) Int. Cl.
*G06F 15/16* (2006.01)
*H04W 8/04* (2009.01)
*H04W 28/18* (2009.01)
*H04W 28/02* (2009.01)
*H04L 45/302* (2022.01)

(52) U.S. Cl.
CPC ............. *H04W 8/04* (2013.01); *H04L 45/302* (2013.01); *H04W 28/0268* (2013.01); *H04W 28/18* (2013.01)

(58) Field of Classification Search
CPC .. H04L 45/302; H04W 8/04; H04W 28/0268; H04W 28/18
See application file for complete search history.

(56) References Cited

U.S. PATENT DOCUMENTS

| | | | | |
|---|---|---|---|---|
| 9,154,371 B1* | 10/2015 | Srinivasan | ............ | H04L 45/245 |
| 9,429,992 B1* | 8/2016 | Ashenbrenner | ..... | G06F 13/4081 |
| 2004/0064583 A1* | 4/2004 | Dani | ................... | H04L 67/1023 |
| | | | | 709/241 |
| 2004/0185778 A1* | 9/2004 | Biundo | ............ | H04M 1/72412 |
| | | | | 455/41.3 |
| 2015/0227739 A1* | 8/2015 | Russello | ............... | G06F 1/1647 |
| | | | | 726/19 |
| 2018/0074329 A1* | 3/2018 | Kazansky | ........... | G06F 3/04842 |
| 2018/0189196 A1* | 7/2018 | Bai | ........................ | G06N 99/00 |
| 2022/0214978 A1* | 7/2022 | Roose | .................. | G06F 1/1632 |

* cited by examiner

*Primary Examiner* — Oleg Survillo
(74) *Attorney, Agent, or Firm* — Kirton McConkie; Brian Tucker

(57) ABSTRACT

When a transport is added, degraded, upgraded or lost between a computing device and a dock, peripherals can be moved or have their configurations modified to thereby seamlessly handoff and efficiently share the peripherals' traffic between the available transport(s). A service can be employed on the computing device to determine when a transport is added, degraded, updated or lost and to identify and implement one or more applicable rules to accomplish the handoff and sharing of the peripherals' traffic.

20 Claims, 17 Drawing Sheets

| Network Event Notification Type | Action(s) |
|---|---|
| Wired transport added to wireless transport | • Move latency-sensitive forward channel peripherals to wired transport<br>• Allocate other peripherals across the wired and wireless transports to efficiently use the transports<br>• If appropriate, adjust peripherals' configurations to efficiently consume the wired and wireless transports |
| Degradation | • Adjust peripherals' configurations to reduce peripherals' consumption of degraded transport<br>• If appropriate, move peripheral(s) from the degraded transport |
| Upgradation | • Adjust peripherals' configurations to efficiently consume the upgraded transport<br>• If appropriate, move peripheral(s) to the upgraded transport |
| Transport Lost | • Move peripherals from lost transport to remaining transport(s)<br>• If appropriate, adjust peripherals' configurations to efficiently consume the remaining transport(s) |

*FIG. 8*

HANDING OFF AND SHARING TRAFFIC ACROSS DIFFERENT TRANSPORTS BETWEEN A COMPUTING DEVICE AND A DOCK

CROSS-REFERENCE TO RELATED APPLICATIONS

N/A

BACKGROUND

A dock provides a way to quickly and easily connect a computing device to peripherals. For example, docks are commonly used in the workplace to connect a laptop to a monitor, keyboard and mouse without sacrificing the laptop's mobility. Traditionally, laptops (and other computing devices) have connected to docks via a physical and oftentimes proprietary connection. However, with the availability of high-speed wireless networks, wireless docks are becoming more commonplace. With a wireless dock, a computing device can access peripherals that are connected to the wireless dock using wireless communication protocols. For example, when a computing device is connected to a wireless dock to which a USB device is connected, the computing device can communicate with the USB device over a Wi-Fi connection using the Media-Agnostic USB (MA-USB) protocol or another USB over IP protocol. Wireless docks oftentimes also enable a computing device to connect via a wired connection (e.g., a USB-C connection or an Ethernet connection). Accordingly, with these so-called hybrid docks, a computing device can use both wired transports and wireless transports to communicate with the dock.

With the latest USB standards, a USB-C connection can support USB and non-USB traffic. For example, a computing device could use a USB-C wired connection to deliver DisplayPort/HDMI traffic to one or more monitors connected to the dock in addition to using the USB-C wired connection to deliver USB traffic to or receive USB traffic from a USB device such as a keyboard, a mouse, a speaker, a webcam, a printer, etc.

The traffic sent between the computing device and the dock can be categorized in two ways: forward channel traffic and back channel traffic. Forward channel traffic is traffic sent by the computing device to the dock and may include: encoded and packetized audio that is to be decoded by the dock and rendered by an audio peripheral connected to the dock; encoded and packetized video that is to be decoded by the dock and rendered by one or more monitors connected to the dock; printer payloads that are routed to a printer connected to the dock, etc. Back channel traffic is traffic sent by the dock to the computing device and may include: MA-USB information from a mouse and a keyboard connected to the dock; video from a webcam connected to the dock; user presence information from a sensor connected to the dock; interactions with buttons on the dock (e.g., a remote power button); information or communications generated by the dock, etc.

FIG. 1 provides an example where a computing device 100 is connected to a dock 200 via a wired connection and a wireless connection. A variety of peripherals can be connected to dock 200 thereby enabling computing device 100 to access the peripherals via wired or wireless transports.

BRIEF SUMMARY

The present invention extends to methods, systems, and computer program products for handing off and sharing traffic across different transports between a computing device and a dock. When a transport is added, degraded, upgraded or lost between a computing device and a dock, peripherals can be moved or have their configurations modified to thereby seamlessly handoff and efficiently share the peripherals' traffic between the available transport(s). A service can be employed on the computing device to determine when a transport is added, degraded, updated or lost and to identify and implement one or more applicable rules to accomplish the handoff and sharing of the peripherals' traffic.

In some embodiments, the present invention may be implemented by a service executing on a computing device as a method for handing off and sharing peripheral traffic across different transports between the computing device and a dock. While a first transport is established between the computing device and the dock, the service can detect that a second transport has been established. The service can then determine that one or more rules indicate that at least one peripheral should be moved from the first transport to the second transport. The service may then cause the at least one peripheral to be moved from the first transport to the second transport such that traffic of the at least one peripheral is transferred over the second transport instead of the first transport.

In some embodiments, the present invention may be implemented as a method for handing off and sharing peripheral traffic across different transports between a computing device and a dock. While a first transport and a second transport are established between the computing device and the dock, it can be detected that the second transport has been lost. At least one peripheral whose traffic was being transferred over the second transport can be paused. The at least one peripheral can be moved from the second transport to the first transport. The at least one peripheral can then be resumed.

In some embodiments, the present invention may be implemented as computer storage media storing computer executable instructions which when executed implement a method for handing off and sharing peripheral traffic across different transports between a computing device and a dock. The method can include: while a first transport is established between the computing device and the dock, detecting that a second transport has been established; determining that one or more rules indicate that at least one peripheral should be moved from the first transport to the second transport; and causing the at least one peripheral to be moved from the first transport to the second transport such that traffic of the at least one peripheral is transferred over the second transport instead of the first transport.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 8 provides a simplified example of how rules may be configured in one or more embodiments of the present invention.

DETAILED DESCRIPTION

In the specification and the claims, the term "transport" should be given its standard definition in networking such as a technique/protocol for communicating over a connection between two devices. A "wired transport" should be construed as a transport implemented over a wire/cable, whereas a "wireless transport" should be construed as a transport implemented wirelessly. In current implementations of embodiments of the present invention, a common wired transport may include a USB-based transport (e.g., USB 3.1 or higher) implemented over a USB-C cable, and a common wireless transport may include a USB-based transport (e.g., MA-USB) implemented over a Wi-Fi connection. However, embodiments of the present invention should not be limited to any particular wired or wireless transports.

Figure 1:
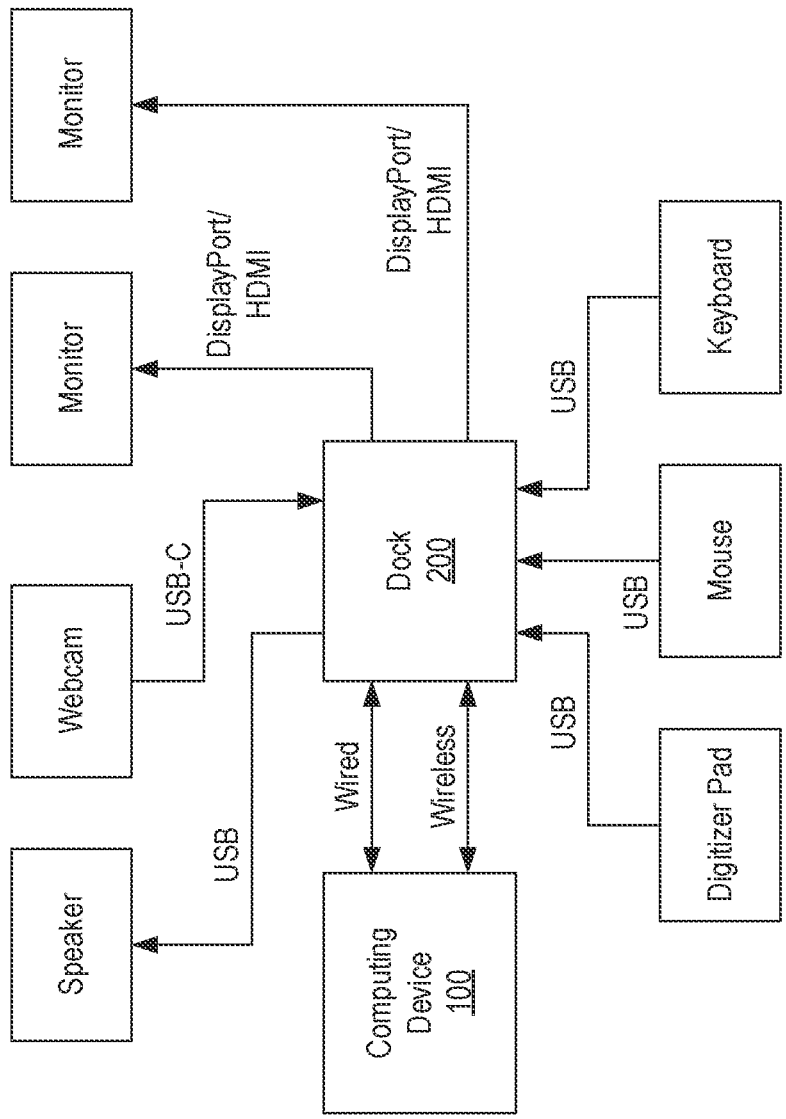
FIG. 1 provides an example of how a computing device may use wired and wireless transports to communicate with peripherals connected to a dock.
Figure 2:
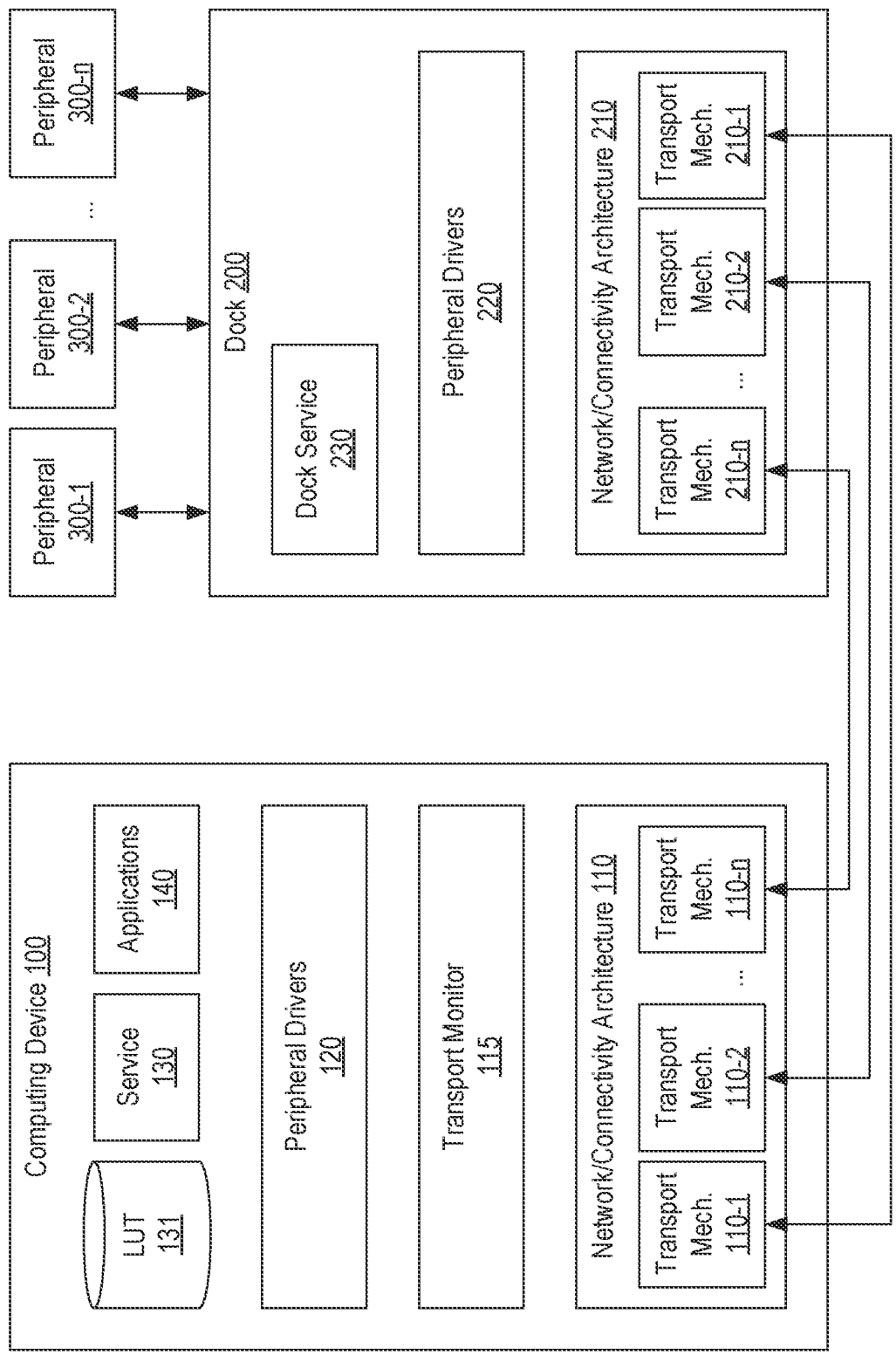
FIG. 2 generally represents how the computing device and the dock may be configured to enable the handing off and sharing of traffic across different transports in accordance with one or more embodiments of the present invention.

FIG. 2 provides an example of various components that may exist on a computing device 100 and a dock 200 that are configured in accordance with one or more embodiments of the present invention. Computing device 100 and dock 200 can include network/connectivity architectures 110 and 210 respectively which are intended to generally represent the various hardware and software components that are used to implement transports. Network/connective architectures 110 and 210 are represented as having multiple transport mechanisms 110-1 through 110-*n* and 210-1 through 210-*n* respectively which can represent the hardware and software components for implementing a particular transport. For example, transport mechanisms 110-1 and 210-1 could represent the components for implementing a USB-based wired transport, transport mechanisms 110-2 and 210-2 could represent the components for implementing a Wi-Fi-based wireless transport, and transport mechanisms 110-*n* and 210-*n* could represent the components for implementing an Ethernet-based wired transport. To implement embodiments of the present invention, computing device 100's network/connectivity architecture 110 need only include transport mechanisms sufficient for establishing at least two transports with the transport mechanisms available in dock 200's network/connectivity architecture 210.

Computing device 100 and dock 200 can also include peripheral drivers 120 and 220 respectively which are intended to generally represent the drivers/components for supporting any peripheral that may be connected to dock 200. For example, a number of applications 140 may run on computing device 100 and may use peripheral drivers 120 to communicate with peripheral 300-1 through 300-*n* connected to dock 200.

In accordance with embodiments of the present invention, computing device 100 may also include a transport monitor 115, a service 130 and a look-up table (LUT) 131, while dock 200 may include a dock service 230. Transport monitor 115 may be in the form of a filter driver that is loaded on the network stacks that transport mechanisms 110-1 through 110-*n* create. Although a single transport monitor 115 is shown, in some embodiments, a separate instance of transport monitor 115 may be created for each transport that is established between computing device 100 and dock 200. In some Windows-based embodiments, transport monitor 115 may be in the form of a Network Driver Interface Specification (NDIS) filter driver.

As an overview, service 130 can be configured to determine when a change has occurred in the transports between computing device 100 and dock 200 (e.g., the addition of a transport, the loss of a transport, a degradation of a transport, an upgradation of a transport, etc.) and, in response, can dynamically hand off and/or share traffic across the transports in accordance with rules defined in LUT 131. Service 130 can interface with transport monitor 115, dock service 230 and the operating system on computing device 100 to perform this handing off and sharing of traffic. In this way, service 130 can implement load balancing, maximize peripheral performance and prevent peripheral disconnects, among possibly other benefits.

Figure 3:
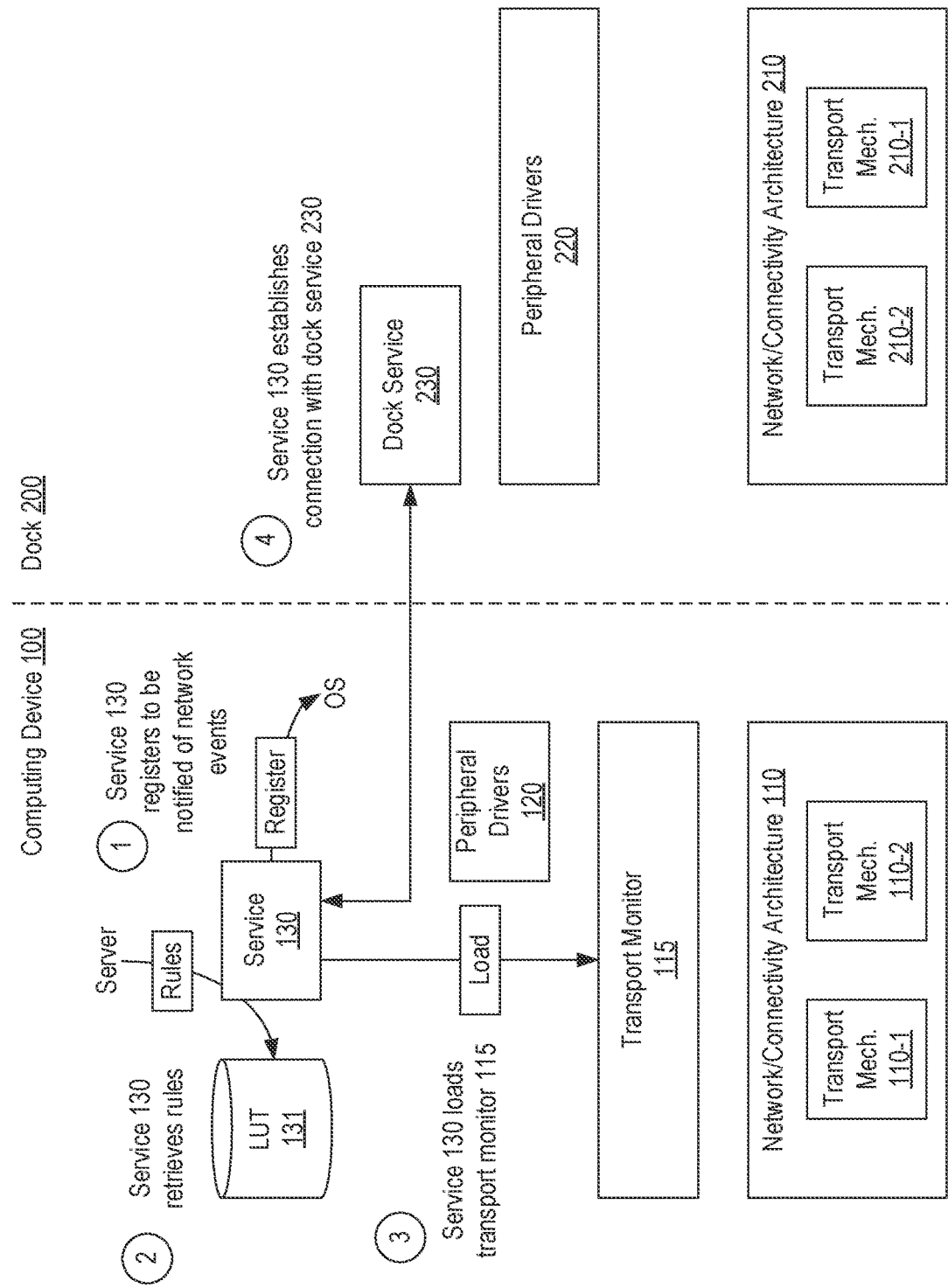
FIG. 3 provides an example of functionality that a service on the computing device can perform as part of initialization in accordance with one or more embodiments of the present invention.

FIGS. 3-6D provide examples of functionality that can be performed on computing device 100 and dock 200 when embodiments of the present invention are implemented. FIG. 3 represents functionality that service 130 can perform as part of initialization. FIGS. 4A-4E provide an example of functionality that can be performed to move peripherals between transports when a transport is added. FIGS. 5A-5C provide an example of functionality that can be performed to modify parameters of peripherals when a transport is degraded. Similar functionality can be performed when a transport is upgraded. FIGS. 6A-6D provide an example of functionality that can be performed to move peripherals to a remaining transport when a transport is lost. For simplicity, in each of these examples, it will be assumed that network/connectivity architectures 110 and 210 each include two transport mechanisms, transport mechanisms 110-1 and 110-2 and transport mechanisms 210-1 and 210-2 respectively.

Turning to FIG. 3, service 130 is shown as performing a number of steps as part of its initialization. As an example, service 130 may perform these steps when it is loaded on computing device 100, when it determines that computing device 100 has been connected to dock 200 or at any other suitable time. In step 1, service 130 can register with the operating system to be notified of network events, and particularly of changes in any transports between computing device 100 and dock 200. In step 2, service 130 may retrieve rules or updates to rules (e.g., from a server) and store them in LUT 131. In step 3, service 130 may cause transport monitor 115 to be loaded (or otherwise ensure that transport monitor 115 is loaded) so that transport monitor 115 can monitor the transports established between computing device 100 and dock 200. In step 4, service 130 may establish a connection with dock service 230. In some embodiments, this may be an out-of-band (OOB) connection (i.e., a connection that is not via the transports used for peripheral traffic). As part of establishing this connection, service 130 can register with dock service 230 to be notified of network events that may occur on dock 200.

Figure 4A:
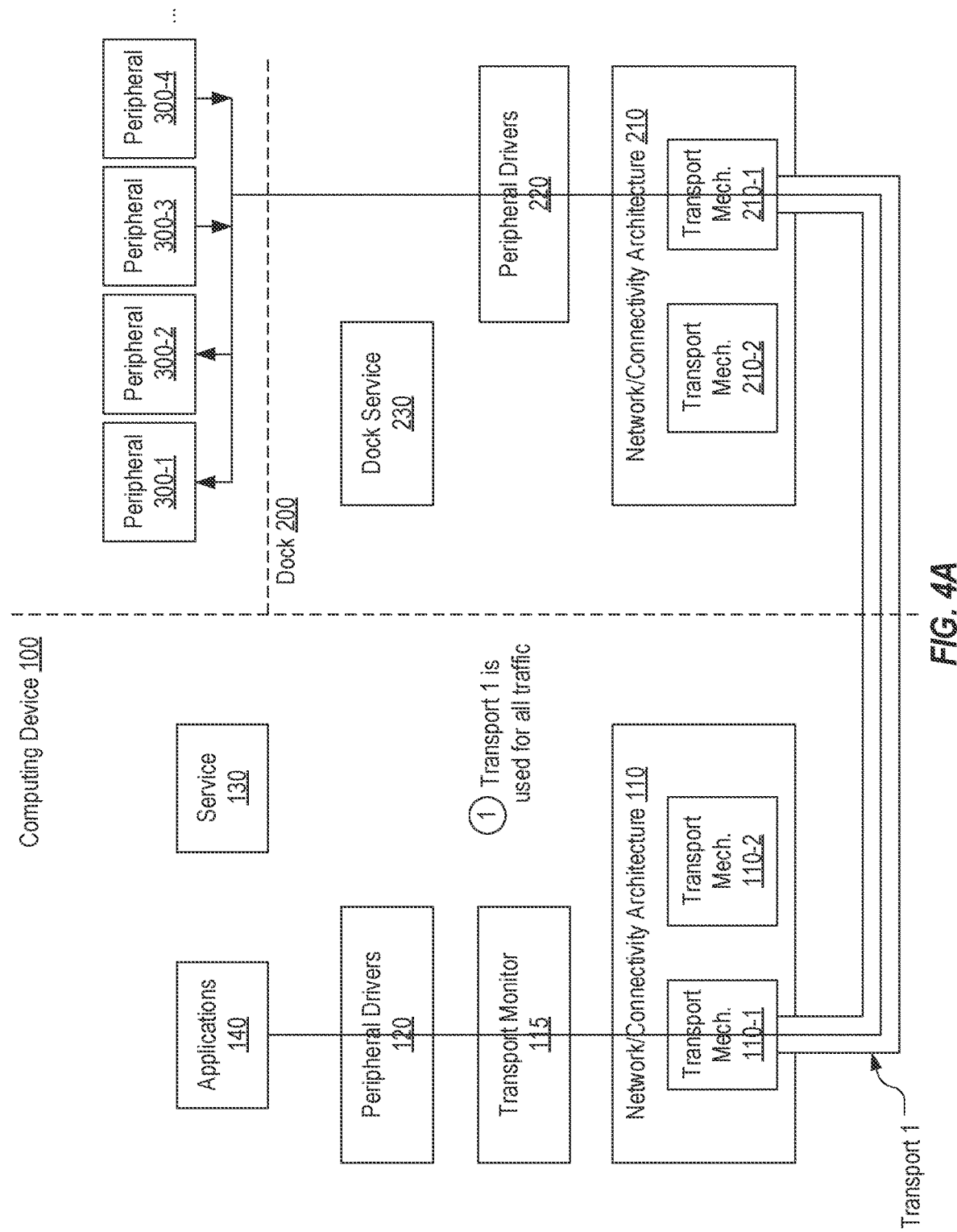
FIGS. 4A-4E provide an example of functionality that can be performed to move peripherals between transports when a transport is added between the computing device and the dock in accordance with one or more embodiments of the present invention.

Turning to FIG. 4A, it is now assumed that transport 1 has been established between computing device 100 and dock 200 and, as represented as step 1, all peripheral traffic is being delivered via transport 1. For example, transport 1 could represent a USB-C cable connected between computing device 100 and dock 200 over which the USB 3.1 or greater protocol is implemented to deliver USB traffic including Alt Mode traffic. It is further assumed that four peripherals 300-1 through 300-4 are connected to dock 200 and that peripherals 300-1 and 300-2 are forward channel peripherals and that peripherals 300-3 and 300-4 are back channel peripherals.

Figure 4B:
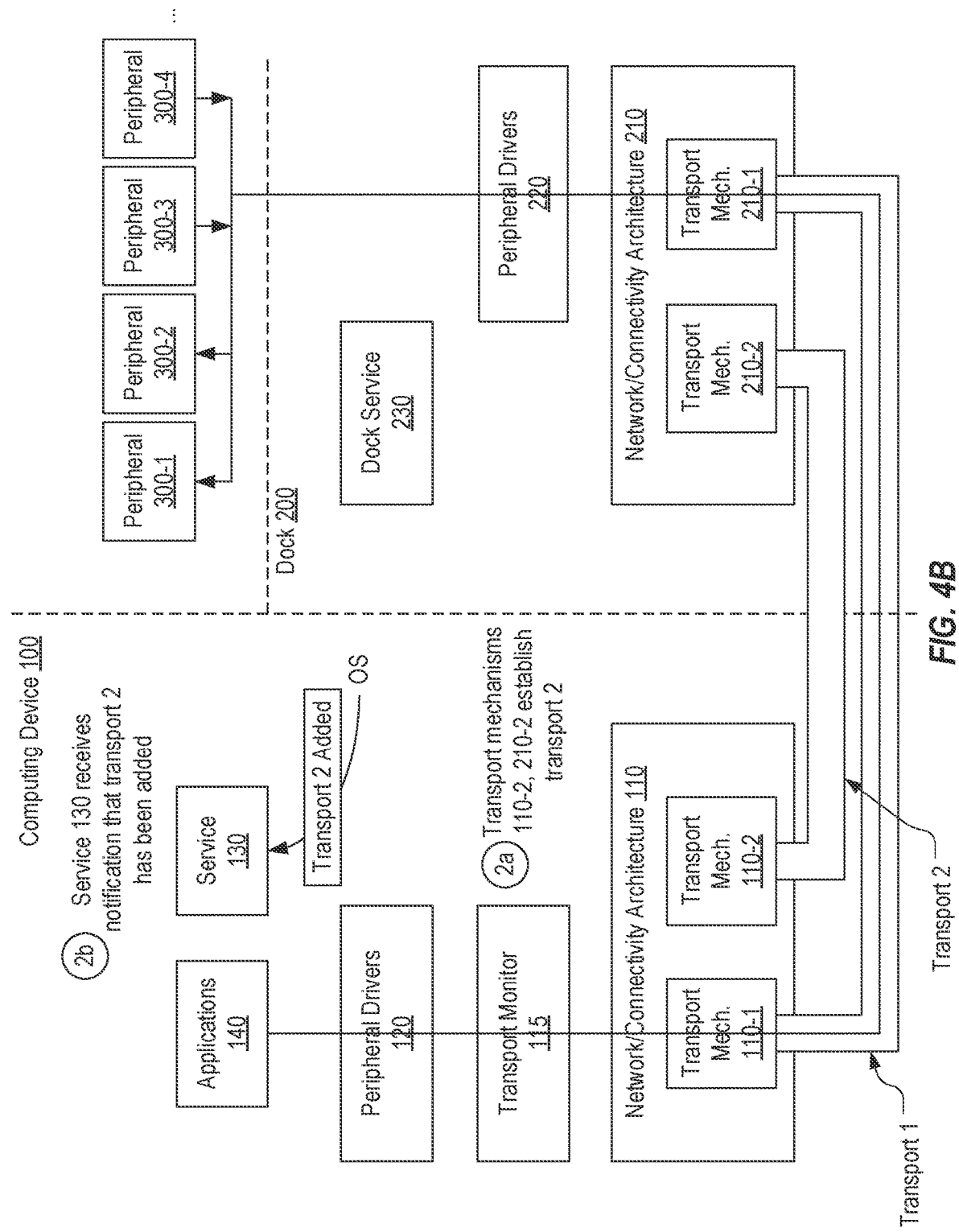

Turning to FIG. 4B, as represented as step 2a, it is assumed that transport mechanisms 110-2 and 210-2 establish transport 2 between computing device 100 and dock 200. For example, transport 2 could represent a Wi-Fi connection over which the MA-USB protocol is implemented to deliver USB traffic including Alt Mode traffic. In conjunction with transport 2 being established, in step 2b, service 130 can receive a network event notification which indicates that transport 2 has been added. At this point, it can be assumed that all peripheral traffic is still being delivered via transport 1.

Figure 4C:
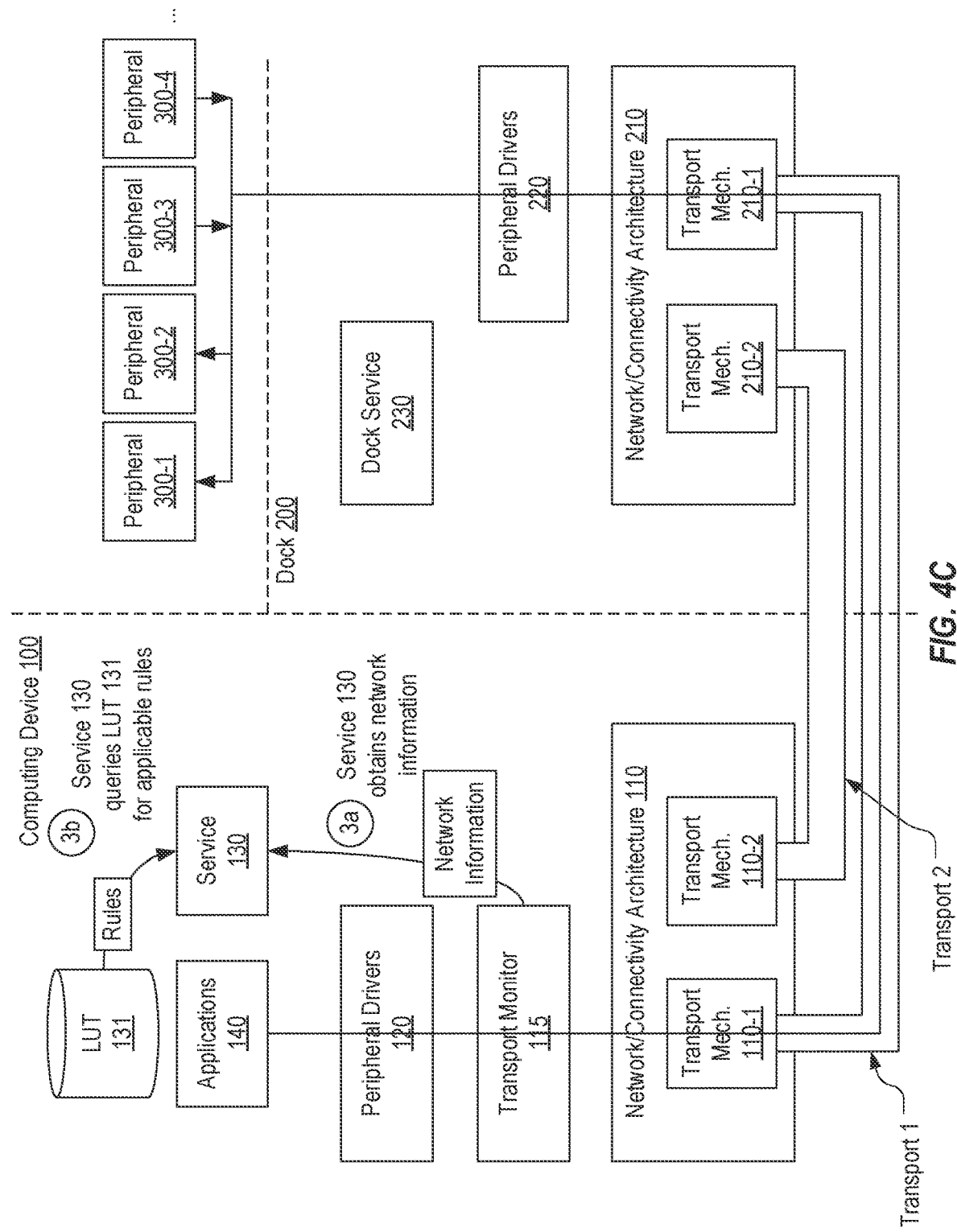

Turning to FIG. 4C, in response to being notified that transport 2 has been added, in step 3a, service 130 can obtain network information. For example, service 130 could query transport monitor 115 and/or a component of the operating system including component(s) of network/connectivity architecture 110 to obtain network information for transport 2. This network information could include the bandwidth, latency, jitter, etc. of the network connection over which transport 2 is implemented. It is assumed that service 130 previously obtained such network information for transport 1, but step 3a could also entail obtaining network information for transport 1. In step 3b, service 130 can also query LUT 131 for rules applicable to the current network event. For example, service 130 could obtain one or more rules applicable to a scenario when a transport is added. As an example, a rule may define that latency-sensitive forward channel peripherals should be moved from a wireless transport to a wired transport. As another example, a rule may define how particular types of peripherals should be distributed between/among different types of transports to efficiently use the transports such as by moving bandwidth sensitive peripherals to a transport with greater bandwidth.

Figure 4D:
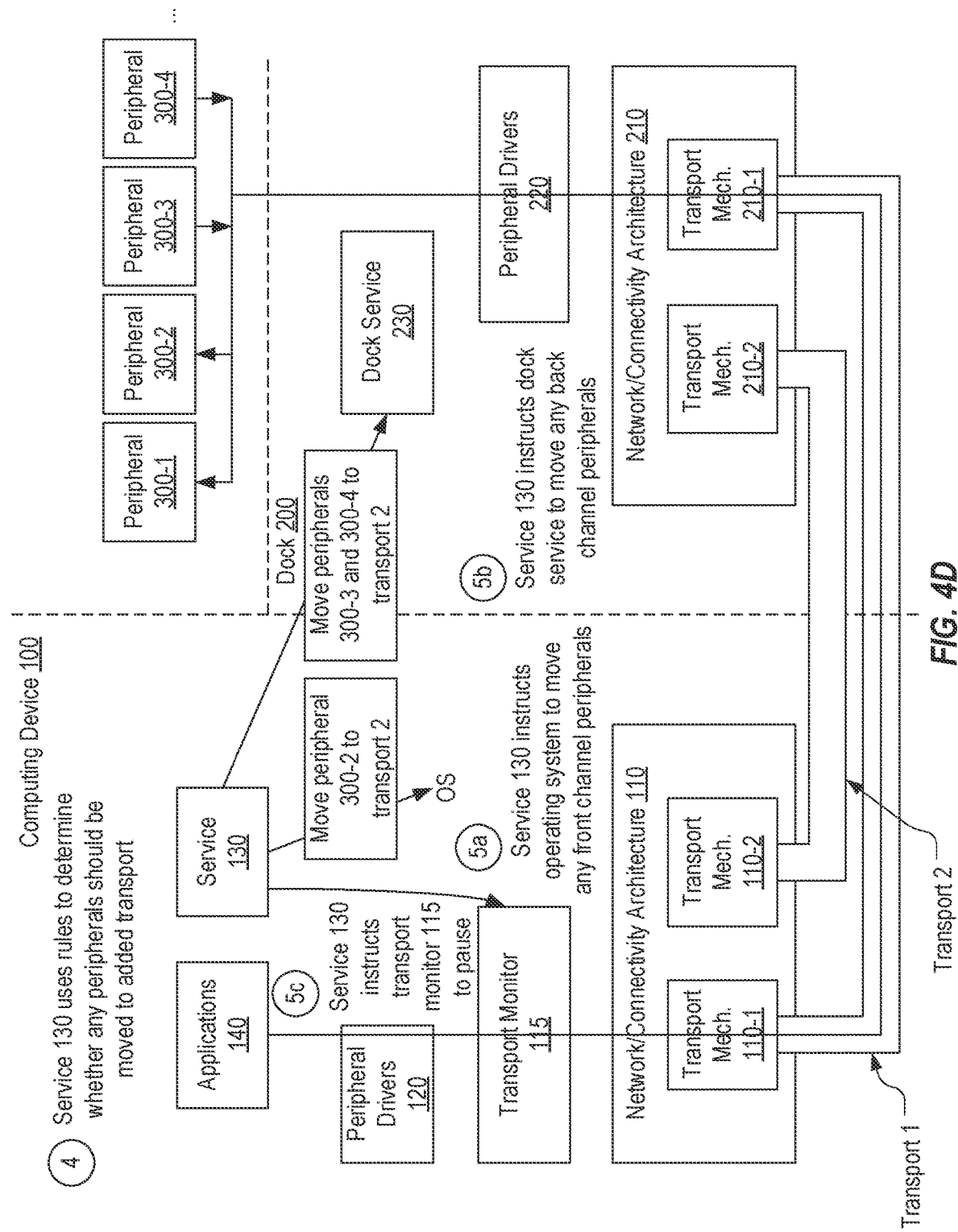
Figure 5A:
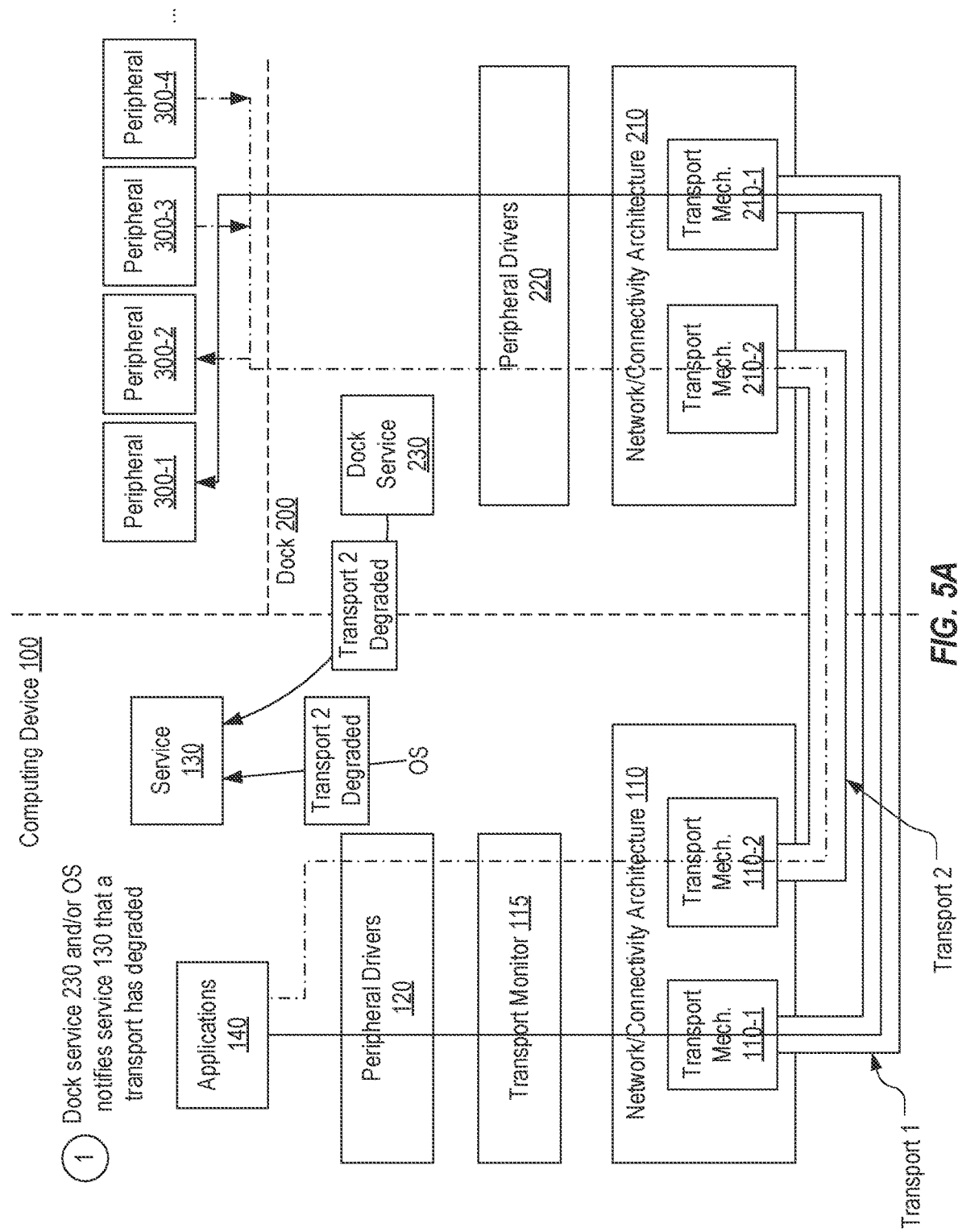
FIGS. 5A-5C provide an example of functionality that can be performed to modify parameters of peripherals when a transport is degraded in accordance with one or more embodiments of the present invention.
Figure 5B:
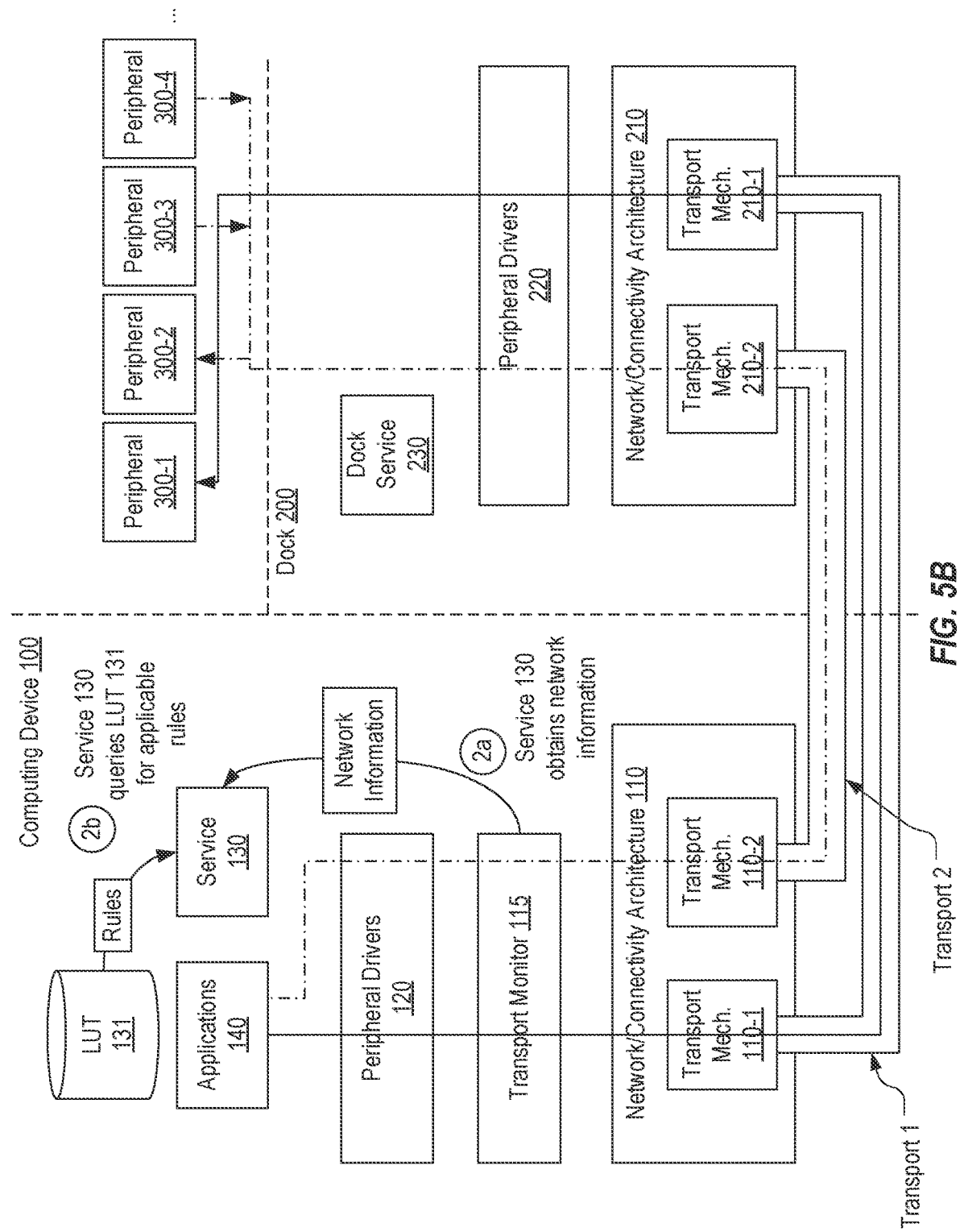
Figure 5C:
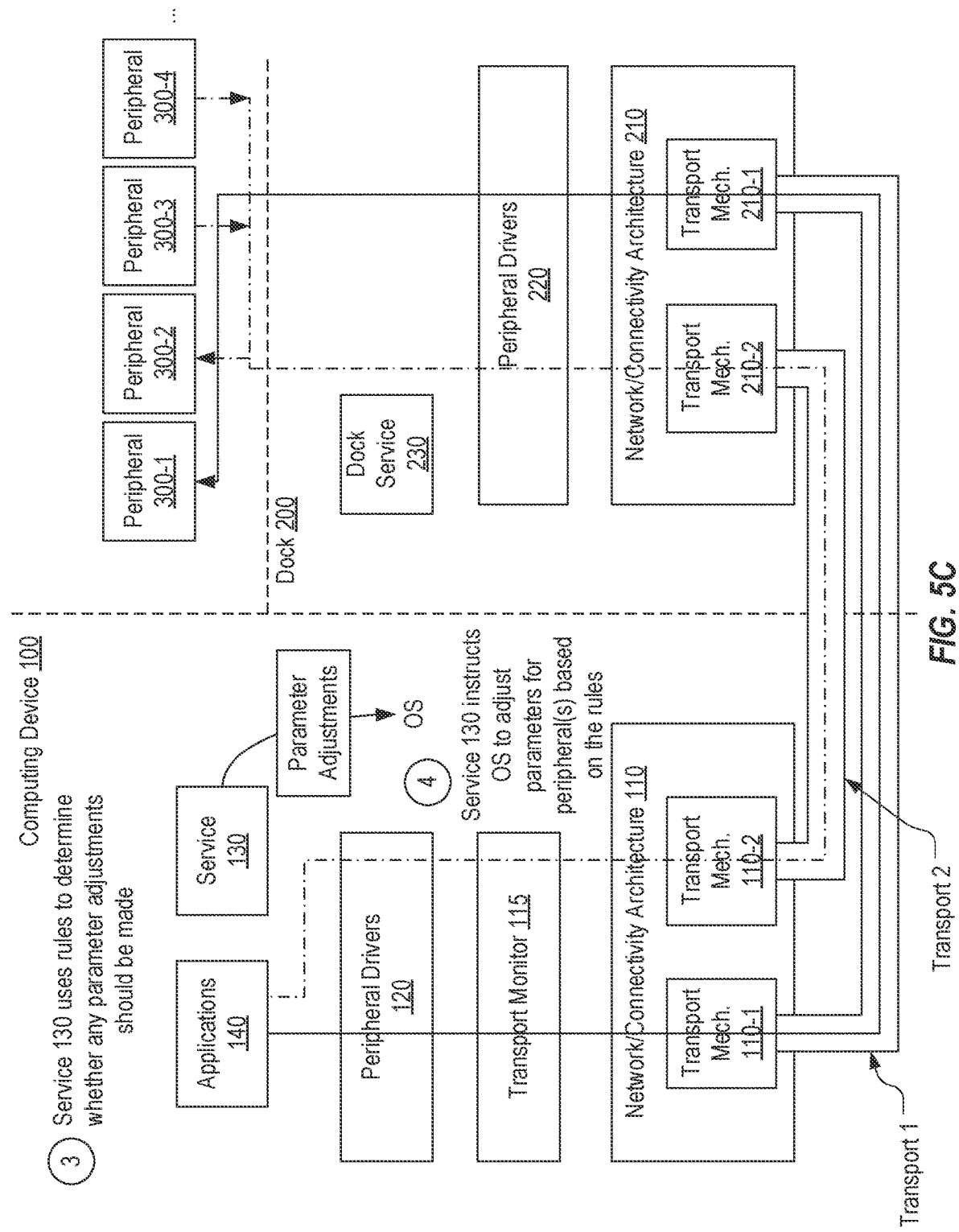

Turning to FIG. 4D, in step 4, service 130 uses the rule(s) identified in step 3b to determine which peripherals, if any, should be moved to the added transport. As part of step 4, service 130 may also determine whether any modifications should be made to configurations of any peripheral in a similar manner as represented in FIGS. 5A-5C. Then, in step 5a, for any front channel peripheral that service 130 determines should be moved to the added transport, service 130 can instruct the operating system to move the peripheral. Similarly, for any back channel peripheral that service 130 determines should be moved to the added transport, service 130 can instruct dock service 230 to move the peripheral. For example, assuming that service 130 determines that peripherals 300-2 through 300-4 should be moved to transport 2, service 130 can instruct the operating system to move peripheral 300-2 and can instruct dock service 230 to move peripherals 300-3 and 300-4. In some embodiments, service 130 may also adjust configurations for any of the peripherals as part of steps 5a and 5b.

In conjunction with instructing the movement of the peripherals, in step 5c, service 130 may also instruct transport monitor 115 to pause the peripherals to be moved. Pausing a peripheral may entail maintaining the peripherals device object and, for some peripherals such as any non-streaming peripheral, pausing the peripheral's queue until the peripheral has been moved to the added transport. By maintaining the peripheral's device object, transport monitor 115 can prevent a device disconnect from occurring on computing device 100 thereby hiding from applications 140 the move of the peripheral to the added transport. Also, by pausing the peripheral's queue, the peripheral's traffic will not be lost during the move.

Figure 4E:
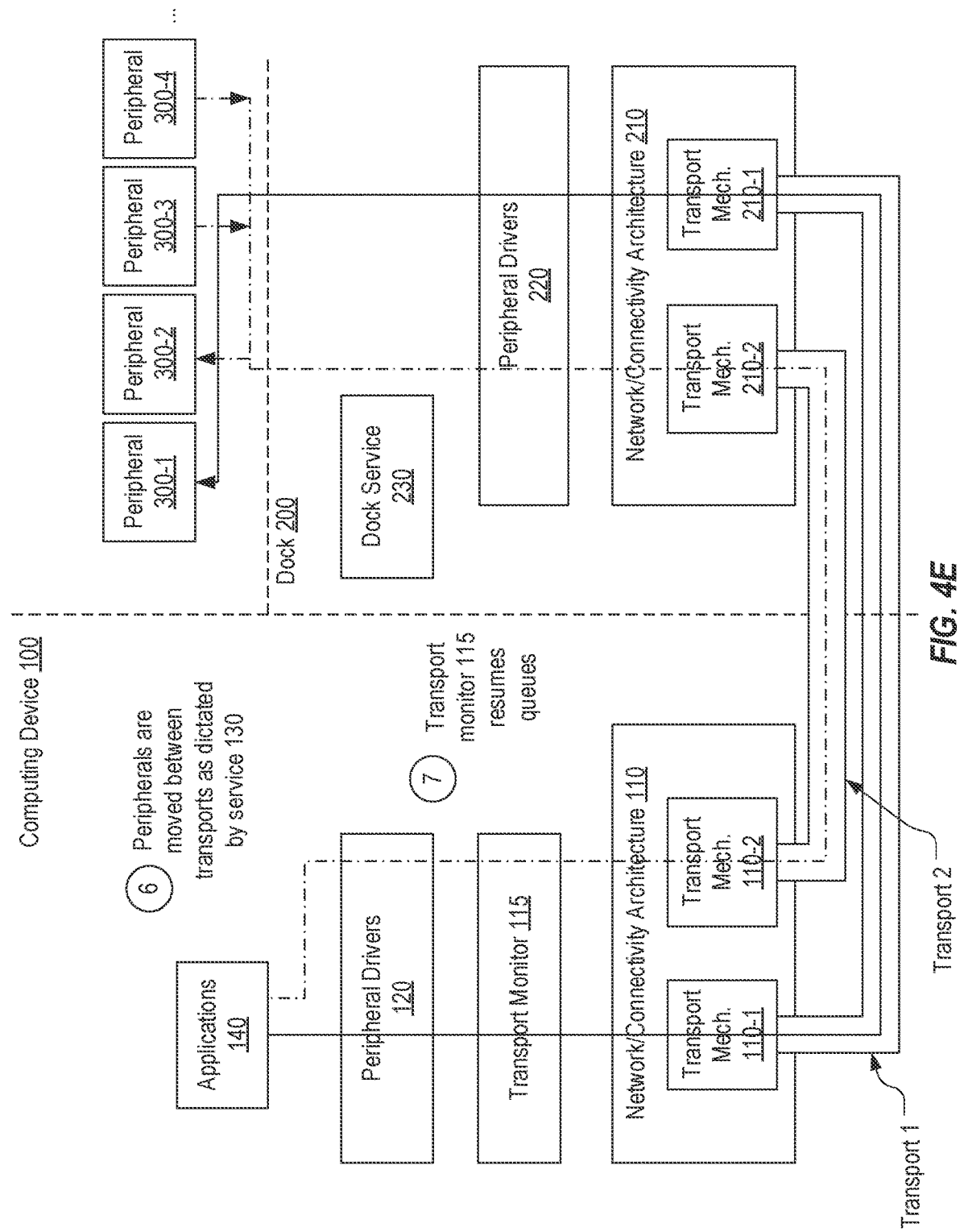

Turning to FIG. 4E, in step 6, the peripherals can be moved to the added transport as instructed by service 130. For example, dock service 230 could cause peripherals 300-3 and 300-4 to be moved to transport 2 such that their back channel traffic is delivered to applications 140 via transport 2. Similarly, the operating system could cause peripheral 300-2 to be moved to transport 2 such that its forward channel traffic is delivered via transport 2. In this example, only peripheral 300-1 remains on transport 1 after step 6. In step 7, transport monitor 115 can resume any paused queue so that the queued traffic is resumed via transport 2. As a result of this process and in response to transport 2 being added, the traffic of peripherals 300-1 through 300-4 will be shared across transports 1 and 2 and the handoff will have occurred seamlessly from the perspective of applications 140 and peripherals 300-1 through 300-4.

FIGS. 5A-5C continue the example of FIGS. 4A-4E and represent how service 130 can respond to a degradation in a transport. Service 130 could respond similarly to an upgradation in a transport. In step 1 represented in FIG. 5A, it is assumed that the operating system and/or dock service 230 sends service 130 a network event notification indicating that transport 2 has degraded. For example, the network event notification could indicate that the bandwidth of the connection over which transport 2 is implemented has dropped or that the latency of the connection has increased.

Turning to FIG. 5B, in response to the network event notification, in step 2a, service 130 can retrieve network information in a similar manner as described for step 3a of FIG. 4C. For example, service 130 could determine the bandwidth, latency, jitter, etc. of transport 2. In some instances, service 130 may also determine such network information of transport 1. In step 2b, service 130 may also query LUT 131 to obtain one or more applicable rules. For example, service 130 may identify one or more rules applicable to scenarios where one transport is degraded relative to another transport.

Turning to FIG. 5C, in step 3, service 130 uses the rule(s) identified in step 2b to determine whether any modifications should be made to configurations of any peripheral. In other words, in the network degradation scenario, service 130 may not move any peripherals between transports but may modify the configurations of the peripherals to minimize the impact the degradation may have on the peripherals' performance. As examples, these modifications could include changing an encoding type of a peripheral's traffic (e.g., lossless to lossy), changing the transport protocol used for the peripheral's traffic (e.g., MA-USB/TCP to MA-USB/ UDP or DisplayLink/TCP to RTP/UDP), another modification that may reduce consumption of the transport, etc.

In step 4, service 130 can instruct the operating system to adjust the configurations in accordance with the applicable rule(s) or otherwise cause the adjustments to be made. Given that no peripherals are moved in this example, the peripherals' traffic will continue to be delivered via the same transports but the delivery of the traffic will occur in accordance with the modifications specified by service 130.

If service 130 receives a network event notification indicative of an upgrade in a degraded transport, service 130 could respond similarly by adjusting configurations of the peripherals to efficiently use the available transports. For example, service 130 could change an encoding type, a transport protocol, etc.

In some embodiments, when service 130 receives a network event notification indicative of a transport degradation, service 130 may determine whether the degradation is significant enough to be treated as a loss of the transport. For example, if the latency or packet loss increases above a threshold or the bandwidth falls below a threshold, service 130 may treat the degradation as a loss and may move peripherals from the degraded transport.

FIGS. 6A-6D continue the example of FIGS. 5A-5C and represent how service 130 can respond to a loss of a transport. In step 1a represented in FIG. 6A, it is assumed that transport 2 is lost. For example, if the transport is a wired transport, this loss may occur when the cable is disconnected, whereas, if the transport is a wireless transport, this loss may occur if computing device 100 and/or dock 200 become disconnected from a wireless access point. However, embodiments of the present invention should not be limited by the reason for any loss in a transport. Also, a transport may be deemed lost when it is degraded beyond a threshold as mentioned above. In step 1b, service 130 can receive a network event notification indicating that transport 2 has been lost. As shown, this network event notification could be received from the operating system and/or dock service 230 depending on the reason for the lost transport.

Figure 6A:
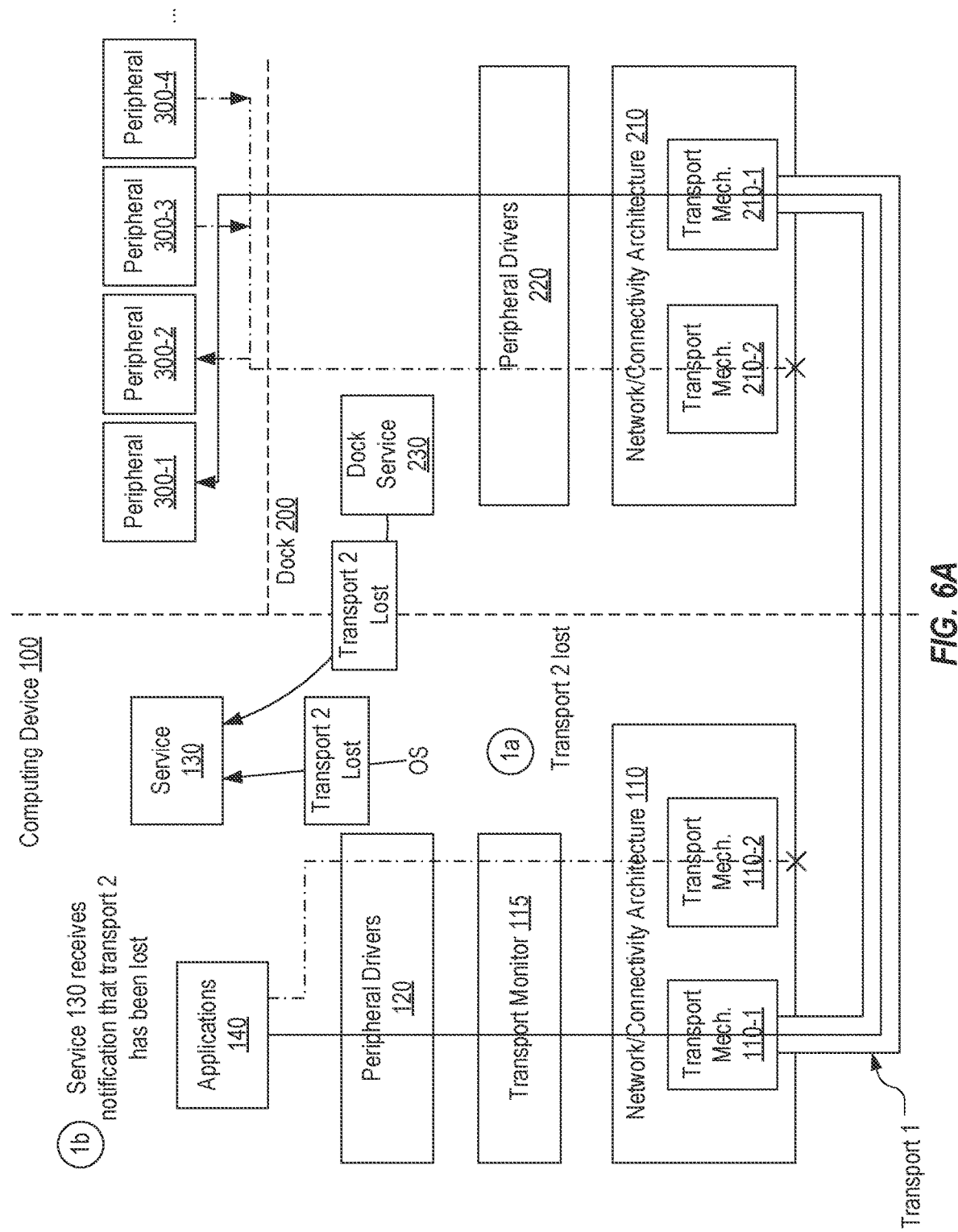
FIGS. 6A-6D provide an example of functionality that can be performed to move peripherals to a remaining transport when a transport is lost in accordance with one or more embodiments of the present invention.
Figure 6B:
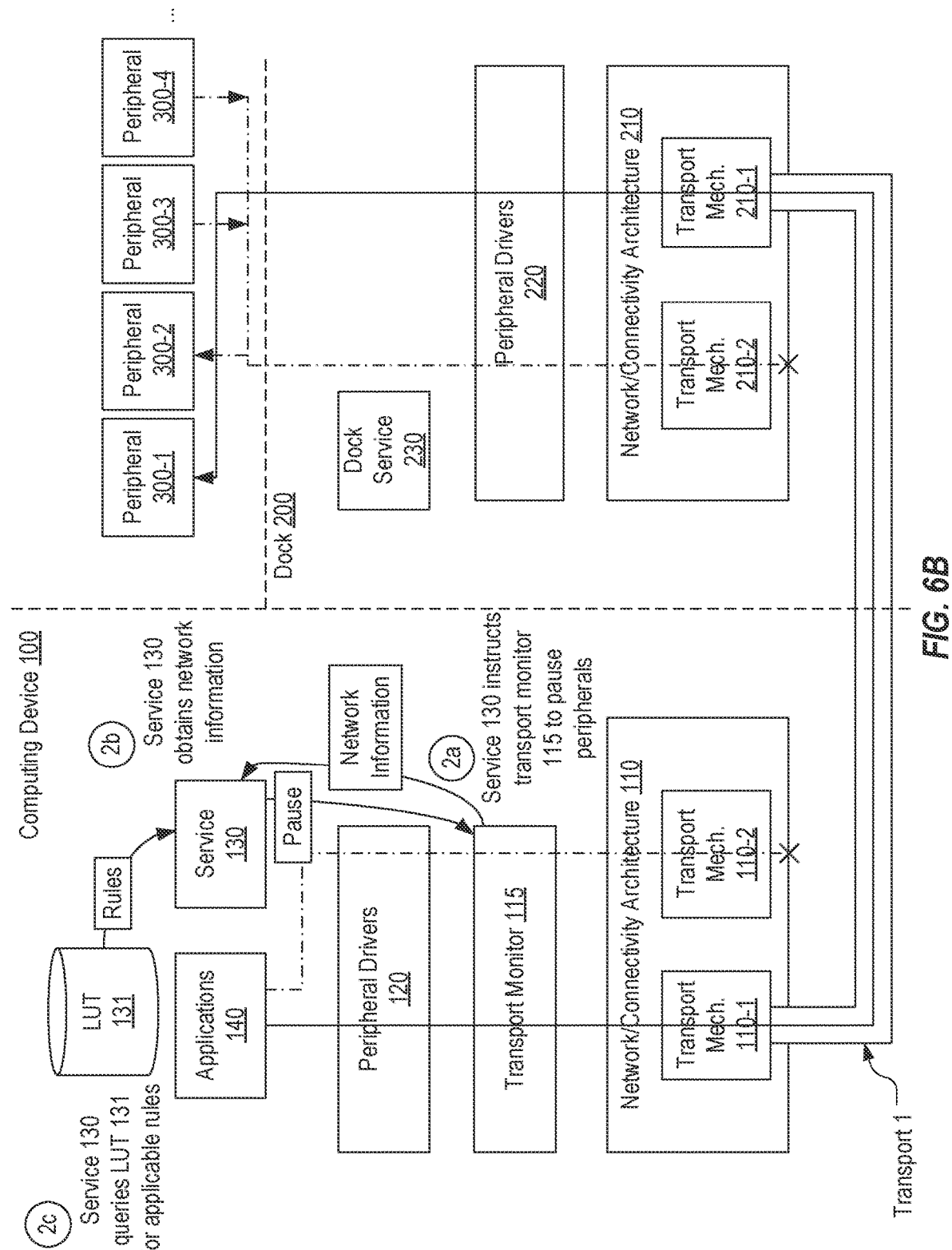

Turning to FIG. 6B, in step 2a, service 130 can instruct transport monitor 115 to pause the peripherals whose traffic was being delivered over the lost transport. For example, this pausing may entail maintaining the peripherals' device objects to prevent device disconnects and pausing the queue of any non-streaming peripheral to prevent traffic loss while service 130 moves the peripherals. In step 2b, service 130 can retrieve network information for each remaining transport in a similar manner as described for step 3a of FIG. 4C. For example, service 130 can identify the bandwidth, latency, jitter, etc. of transport 1. In step 2c, service 130 can query LUT 131 to obtain one or more applicable rules. For example, service 130 may identify one or more rules applicable to scenarios where a transport is lost.

Figure 6C:
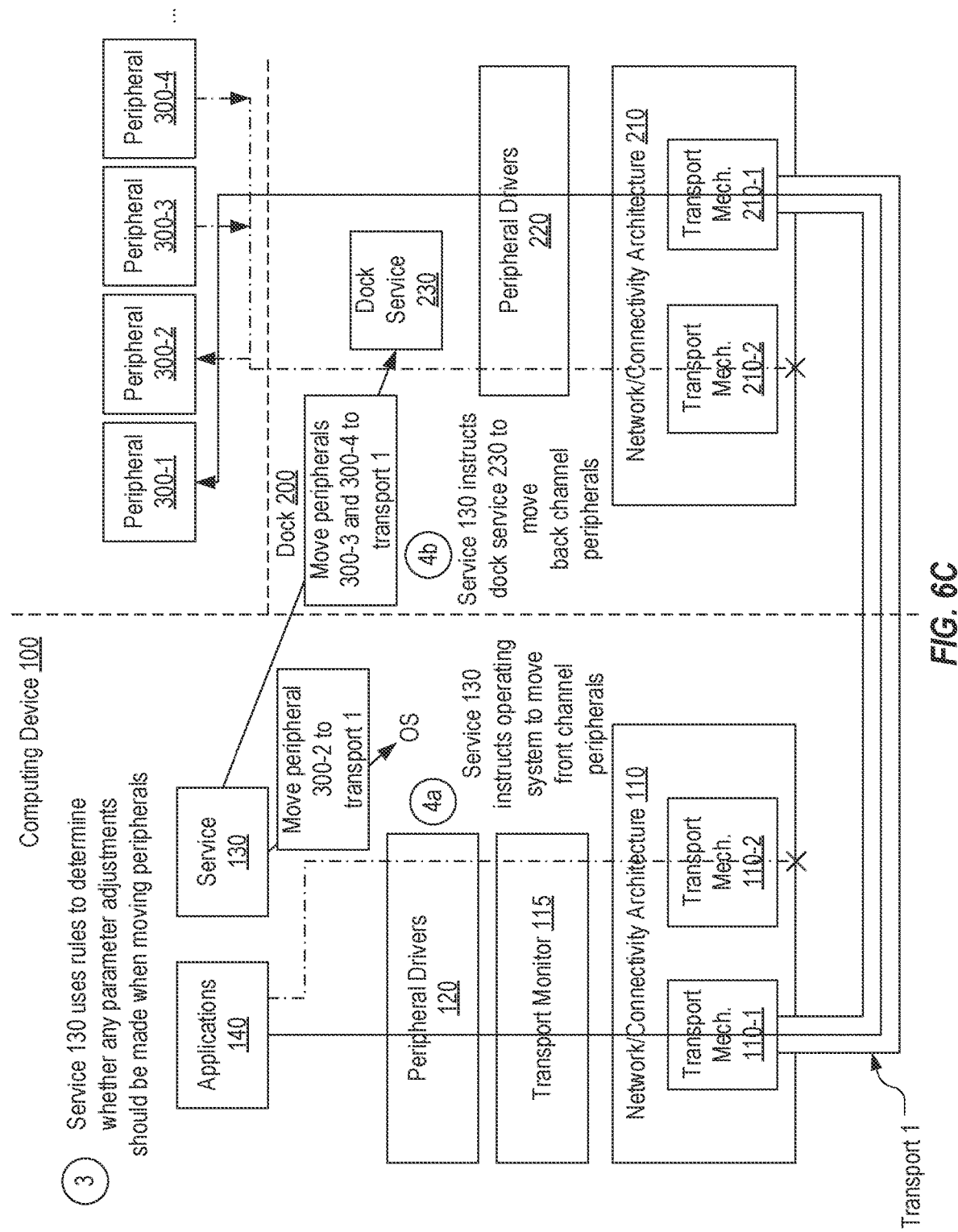

Turning to FIG. 6C, in step 3, service 130 uses the rule(s) identified in step 2c to determine how the peripherals should be moved from the lost transport. For example, if more than one transport remains, service 130 could use the rules to determine to which of the remaining transports a peripheral should be moved. Regardless of the number of remaining transports, service 130 may determine whether any modifications should be made to configurations of any peripheral in a similar manner as represented in FIGS. 5A-5C. In the depicted example, peripherals 300-2 through 300-4 will be moved back to transport 1 and therefore, service 130 may use the applicable rule(s) to adjust configurations of the peripherals to ensure efficient utilization of transport 1.

In step 4a, for any front channel peripheral that service 130 determines should be moved to a remaining transport, service 130 can instruct the operating system to move the peripheral. Similarly, for any back channel peripheral that service 130 determines should be moved to a remaining transport, service 130 can instruct dock service 230 to move the peripheral. For example, service 130 can instruct the operating system to move peripheral 300-2 and can instruct dock service 230 to move peripherals 300-3 and 300-4. Service 130 may also initiate the adjustment of any configurations for any of the peripherals as part of steps 4a and 4b.

Figure 6D:
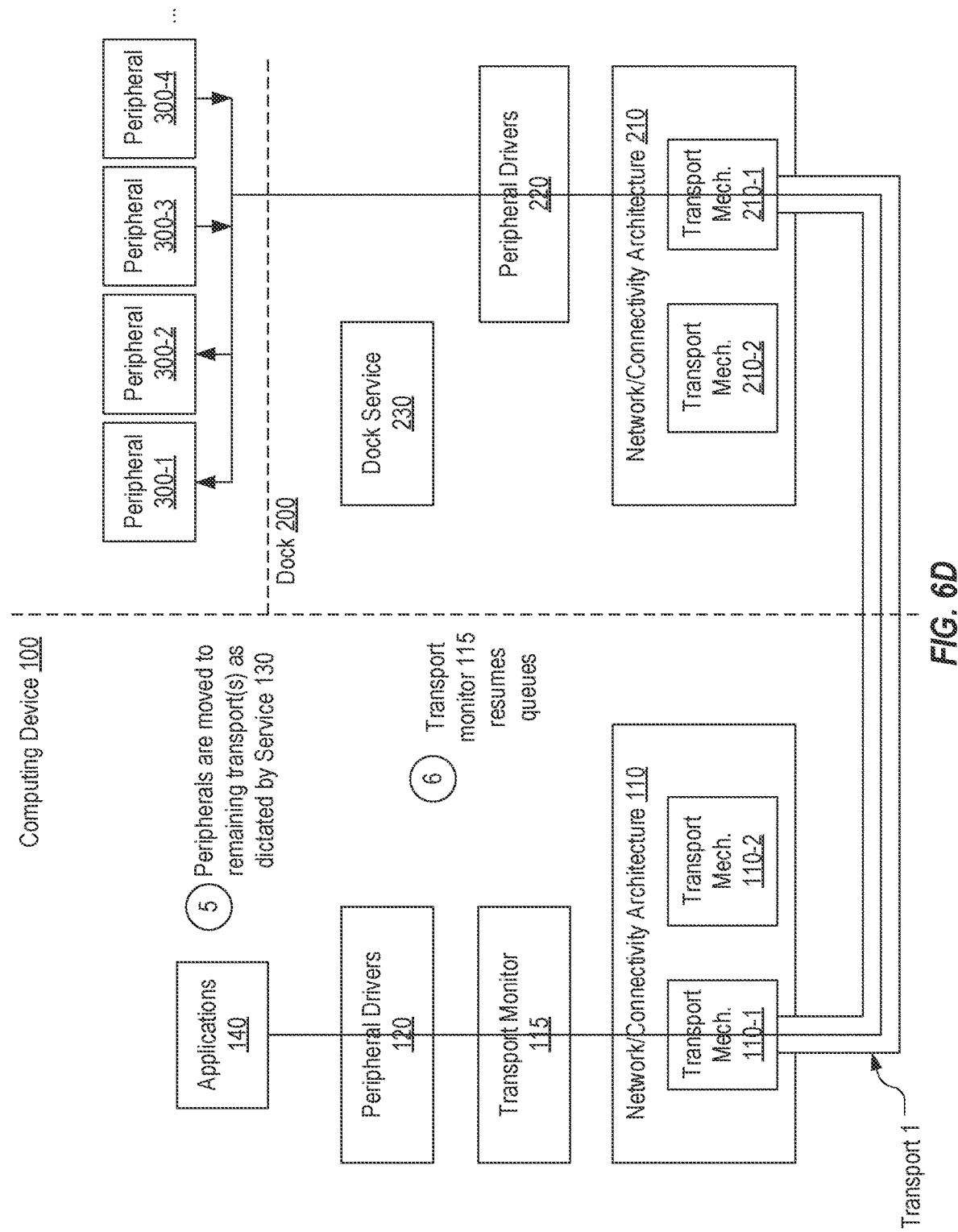

Turning to FIG. 6D, in step 5, the peripherals can be moved to the remaining transport(s) as instructed by service 130. For example, dock service 230 could cause peripherals 300-3 and 300-4 to be moved to transport 1 such that their back channel traffic is delivered to applications 140 via transport 1. Similarly, the operating system could cause peripheral 300-2 to be moved to transport 1 such that its forward channel traffic is delivered via transport 1. Any modifications to the configurations of peripherals 300-1 through 300-4 could also be applied in step 6. In step 7, transport monitor 115 can resume any paused queue so that the queued traffic is resumed via transport 1. As a result of this process, the traffic of peripherals 300-1 through 300-4 will share transport 1 and the handoff will have occurred seamlessly from the perspective of applications 140 and peripherals 300-1 through 300-4.

Figure 7:
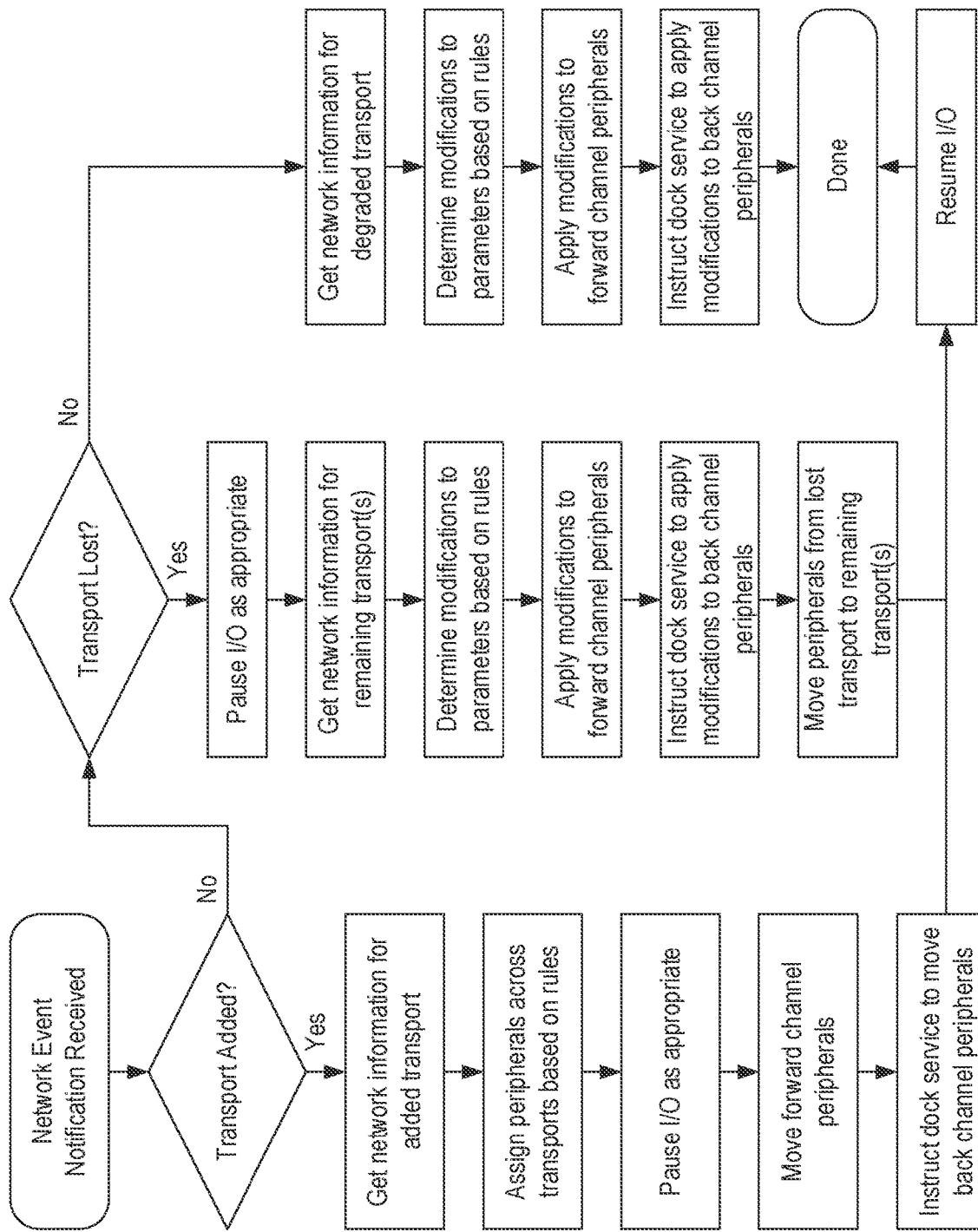
FIG. 7 provides a flowchart for handing off and sharing traffic across different transports between a computing device and a dock in accordance with one or more embodiments of the present invention.

FIG. 7 is a flowchart representing functionality that can be performed on a computing device when a network event notification is received. In response to receiving a network event notification, a service can determine whether a transport has been added. If so, the service can obtain network information for the added transport and assign peripherals across the available transports using the applicable rule(s). Also, the I/O for any peripherals to be moved (e.g., for any non-streaming peripheral) can be paused, any forward channel peripherals can be moved and a dock service can be instructed to move any back channel peripherals. Modifications to the peripherals' configurations could also be made. Any paused I/O may then be resumed.

If a transport has not been added, the service can determine whether a transport has been lost. If so, I/O for any peripherals that were on the lost transport can be paused. The service can obtain network information for the remaining transport(s) and determine modifications to the peripherals' configurations using the applicable rule(s). The modifications can be applied to the configurations of any forward channel peripherals and the dock service can be instructed to apply the modifications to the configurations of any back channel peripherals. Any forward channel peripherals can be moved to the remaining transport(s) and the dock service can be instructed to move any back channel peripherals to the remaining transport(s). Any paused I/O may then be resumed.

If a transport has not been added or lost, but a transport has degraded (or upgraded from a degraded state), the service can obtain network information for the degraded transport (or the upgraded transport) and determine modifications to the peripherals' configurations using the applicable rule(s). The modifications can be applied to the configurations of any forward channel peripherals and the dock service can be instructed to apply the modifications to the configurations of any back channel peripherals.

FIG. 8 provides a simplified example of how rules may be configured in one or more embodiments of the present invention. A first rule defines a variety of actions that a service should perform when a wired transport is added when a wireless transport already is already in use. These actions may include moving any latency-sensitive forward channel peripherals to the wired transport, allocating other peripherals across the wired and wireless transports to balance the load on each transport, adjusting peripherals' configurations if appropriate for accomplishing load balancing, etc. Notably, the service can use the network information about the available transports as well as information about the peripherals to make such load balancing determinations.

A second and third rule define actions that a service should perform when a transport is degraded or upgraded respectively. These actions may include adjusting the peripherals' configurations to efficiently consume the transports including reducing consumption of a degraded transport. In some cases, these actions could include moving one or more peripherals between transports to balance the load on each transport. The service can use the network information about the available transports as well as information about the peripherals to make such load balancing determinations.

A fourth rule defines actions that a service should perform when a transport is lost. These actions include moving peripherals that were on the lost transport to any remaining transport(s). These actions may also include adjusting the peripherals' configurations to ensure efficient utilization of the remaining transport(s). Again, the service can use the network information about the available transports as well as information about the peripherals to make such load balancing determinations.

As stated, FIG. 8 is a simplified example. In embodiments of the present invention, a variety of rules could be defined using a wide range of granularity. For example, rules could be defined for specific types of transports, specific states of the network information, specific peripherals or combinations of peripherals, etc. Notably, an administrator or user could define a rule to accomplish any particular transport sharing or load balancing goal.

As stated above, a rule may specify one or more actions of modifying a peripheral's configuration in response to a network event whether or not any peripherals are moved between transports. In some embodiments, particular actions may be defined for latency-sensitive peripherals and other particular actions may be defined for non-latency-sensitive peripherals. For example, when a transport is degraded, a rule may specify that a display's configuration by modified to reduce the refresh rate or color depth, that a webcam's configuration be modified to reduce the resolution or bitrate, that a burst-type peripheral's configuration be modified to add forward error correction or another reliability mechanism, etc. As another example, when moving a display from a wired transport to a wireless transport, a rule may specify that the video stream should be switched from DisplayLink over USB-C to RTP over UDP, while no changes should be made to the protocol/encoding used by other types of peripherals. Similarly, when moving a display from a wireless transport to a wired transport, a rule may specify that the video stream should be switched from RTP over UDP to DisplayLink over USB-C, while no changes should be made to the protocol/encoding used by other types of peripherals. As a further example, when a transport is added, a rule may specify that latency-sensitive/streaming peripherals be allocated first to the transport with the lowest latency and that the remaining peripherals should be allocated to balance consumption of the transports' respective bandwidths.

In some embodiments, rules could be dynamically determined based on network configuration/conditions and/or contextual information. For example, an agent running on computing device 100 or another computing device could monitor network conditions and/or monitor user presence, battery status or other contextual information and automatically define a rule for a given network event.

The above-described techniques can be implemented when a single computing device 100 or multiple computing devices 100 are connected to dock 200. When multiple computing devices 100 are connected to dock 200, a service 130 running on each of the multiple computing devices 100 can perform the above-described functionality to handoff and share traffic across multiple transports between dock 200 and the respective computing device 100.

In some embodiments, another computing device 100 could function as dock 200. For example, in a peer-to-peer arrangement of computing devices 100, one of the computing devices 200 could function as dock 200 in providing access to a peripheral or content such as a shared screen or game. Accordingly, the term "dock" may be construed as a computing device in such scenarios.

Although the above-described embodiments involved a wired transport and a wireless transport, the present invention encompasses embodiments where multiple wired transports, multiple wireless transports or any combination or wired and wireless transports are used.

In summary, embodiments of the present invention can be implemented to ensure that peripheral traffic can be seamlessly moved and efficiently shared between multiple transports that may be established between a computing device and a dock. By implementing embodiments of the present invention, a user's experience can be enhanced when connecting his or her computing device to a dock.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a service on a computing device, for handing off and sharing peripheral traffic across different transports between the computing device and a dock, the method comprising:
   while a first transport is established between the computing device and the dock, detecting that a second transport has been established, wherein traffic of a first set of one or more peripherals and a second set of one or more peripherals is transferred over the first transport when the second transport is established;
   determining that one or more rules indicate that the first set of one or more peripherals should be moved from the first transport to the second transport and that the second set of one or more peripherals should not be moved from the first transport to the second transport; and
   causing the first set of one or more peripherals to be moved from the first transport to the second transport such that the traffic of the first set of one or more peripherals is transferred over the second transport instead of the first transport while the traffic of the second set of one or more peripherals continues to be transferred over the first transport.

2. The method of claim 1, wherein detecting that the second transport has been established comprises receiving a network event notification.

3. The method of claim 1, wherein the first transport is a wireless transport and the second transport is a wired transport.

4. The method of claim 3, wherein the first set of one or more peripherals includes at least one latency-sensitive peripheral.

5. The method of claim 4, wherein the at least one latency-sensitive peripheral comprises at least one display or at least one webcam.

6. The method of claim 1, wherein the first transport is a wired transport and the second transport is a wireless transport.

7. The method of claim 1, further comprising:
   while the first and second transports are established, detecting that either the first transport or the second transport has degraded; and
   modifying a configuration of each of at least one peripheral whose traffic is being transferred over the degraded transport.

8. The method of claim 7, wherein modifying the configuration comprises modifying one or more of a protocol, an encoding, a reliability mechanism, a bitrate, a color depth or a refresh rate.

9. The method of claim 1, further comprising:
   while the first and second transports are established, detecting that either the first transport or the second transport has upgraded; and
   modifying a configuration of each of at least one peripheral whose traffic is being transferred over the upgraded transport.

10. The method of claim 9, wherein modifying the configuration comprises modifying one or more of a protocol, an encoding, a reliability mechanism, a bitrate, a color depth or a refresh rate.

11. The method of claim 1, further comprising:
    detecting that either the first transport or the second transport has been lost; and
    causing each peripheral whose traffic was being transferred over the lost transport to be moved to a remaining transport.

12. The method of claim 11, further comprising:
    modifying a configuration of each of at least one peripheral.

13. The method of claim 1, wherein causing the first set of one or more peripherals to be moved from the first transport to the second transport comprises pausing traffic of each of the first set of one or more peripherals while it is moved.

14. The method of claim 1, wherein causing the first set of one or more peripherals to be moved from the first transport to the second transport comprises retaining a device object for each of the one or more peripherals in the first set.

15. The method of claim 1, wherein the first set of one or more peripherals comprises a forward channel peripheral and a back channel peripheral and wherein causing the first set of one or more peripherals to be moved from the first transport to the second transport comprises instructing an operating system on the computing device to move the forward channel peripheral to the second transport and instructing a dock service on the dock to move the back channel peripheral to the second transport.

16. One or more computer storage media storing computer executable instructions which when executed implement a method for handing off and sharing peripheral traffic across different transports between a computing device and a dock, the method comprising:
    while a first transport is established between the computing device and the dock, detecting that a second transport has been established, wherein traffic of a first set of one or more peripherals and a second set of one or more peripherals is transferred over the first transport when the second transport is established;
    determining that one or more rules indicate that the first set of one or more peripherals should be moved from the first transport to the second transport and that the second set of one or more peripherals should not be moved from the first transport to the second transport; and causing the first set of one or more peripherals to be moved from the first transport to the second transport such that the traffic of the first set of one or more peripherals is transferred over the second transport instead of the first transport while the traffic of the second set of one or more peripherals continues to be transferred over the first transport.

17. The computer storage media of claim 16, wherein the first set of one or more peripherals comprises a forward channel peripheral and a back channel peripheral and wherein causing the first set of one or more peripherals to be moved from the first transport to the second transport comprises instructing an operating system on the computing device to move the forward channel peripheral to the second transport and instructing a dock service on the dock to move the back channel peripheral to the second transport.

18. A computing device comprising:
   one or more processors; and
   one or more computer storage media storing computer executable instructions which when executed by the one or more processors implement a method for handing off and sharing peripheral traffic across different transports between a computing device and a dock, the method comprising:
      while a first transport is established between the computing device and the dock, detecting that a second transport has been established, wherein traffic of a first set of one or more peripherals and a second set of one or more peripherals is transferred over the first transport when the second transport is established;
      determining that one or more rules indicate that the first set of one or more peripherals should be moved from the first transport to the second transport and that the second set of one or more peripherals should not be moved from the first transport to the second transport; and
      causing the first set of one or more peripherals to be moved from the first transport to the second transport such that the traffic of the first set of one or more peripherals is transferred over the second transport instead of the first transport while the traffic of the second set of one or more peripherals continues to be transferred over the first transport.

19. The computing device of claim 18, wherein the first set of one or more peripherals comprises a forward channel peripheral and a back channel peripheral and wherein causing the first set of one or more peripherals to be moved from the first transport to the second transport comprises instructing an operating system on the computing device to move the forward channel peripheral to the second transport and instructing a dock service on the dock to move the back channel peripheral to the second transport.

20. The computing device of claim 18, wherein the first transport is a wireless transport and the second transport is a wired transport.

\* \* \* \* \*